United States Patent
Berger et al.

(10) Patent No.: US 6,499,509 B2
(45) Date of Patent: Dec. 31, 2002

(54) VALVE MEANS

(75) Inventors: Rolf Berger, Wolfschlugen (DE); Martin Maichl, Salach (DE); Markus Hoffmann, Wolfschlugen (DE); Jürgen Stingel, Stuttgart (DE); Wolfgang Soblik, Remseck (DE); Michael Weinmann, Plüderhausen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/862,824

(22) Filed: May 22, 2001

(65) Prior Publication Data

US 2001/0047828 A1 Dec. 6, 2001

(30) Foreign Application Priority Data

May 25, 2000 (EP) .............................................. 00111239

(51) Int. Cl.⁷ ......................... F15B 13/044; F16K 31/02
(52) U.S. Cl. ............................ 137/625.65; 137/596.17; 137/625.44; 251/129.06
(58) Field of Search ....................... 137/596.17, 625.44, 137/625.65; 251/129.06

(56) References Cited

U.S. PATENT DOCUMENTS

| 3,613,732 A | * 10/1971 | Willson et al. ........ 137/625.44 |
| 3,654,963 A | 4/1972 | Ages |
| 5,040,567 A | * 8/1991 | Nestler et al. ......... 137/625.44 |
| 5,267,589 A | * 12/1993 | Watanabe ............... 251/129.06 |
| 5,711,346 A | * 1/1998 | Pieloth et al. ......... 137/625.44 |
| 5,779,218 A | 7/1998 | Kowanz |
| 6,173,744 B1 | * 1/2001 | Frisch et al. .......... 137/625.44 |
| 6,302,495 B1 | * 10/2001 | Peltz ..................... 251/129.06 |

FOREIGN PATENT DOCUMENTS

| DE | 3032479 A1 | 3/1981 |
| DE | 299 01 855 U1 | 5/1999 |
| EP | 0 547 022 A1 | 12/1992 |
| EP | 0 619 210 A2 | 10/1994 |
| EP | 0 741 248 A2 | 11/1996 |
| EP | 0 875 701 A2 | 11/1998 |
| EP | 0 915 277 A2 | 5/1999 |
| WO | WO 89/04935 | 6/1989 |

OTHER PUBLICATIONS

Abstract of Japanese Publication No. 63–101, 588, Published May 6, 1988.

* cited by examiner

Primary Examiner—Gerald A. Michalsky
(74) Attorney, Agent, or Firm—Hoffmann & Baron, LLP

(57) ABSTRACT

A valve means which comprises a control chamber in a valve housing and into which several fluid duct open. In the control chamber there is at least one pivoting control rocker member serving for the control of at least one of the fluid duct openings and able to be moved between two terminal positions, one pivotal position of such control rocker member being influenced by an electrically activated flexible element. The flexible element may act within the control chamber on an actuating part of the control rocker member. The latter is biased by spring means into a first terminal position, the flexible element engaging the actuating portion of the control rocker member in the electrically non-excited state mechanically free of stress and without any spring bias.

36 Claims, 9 Drawing Sheets

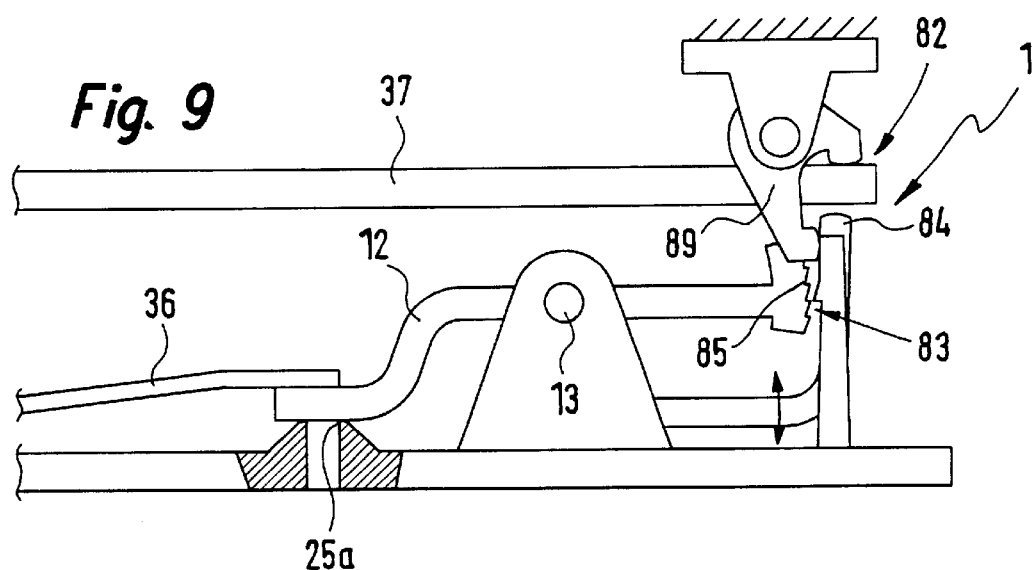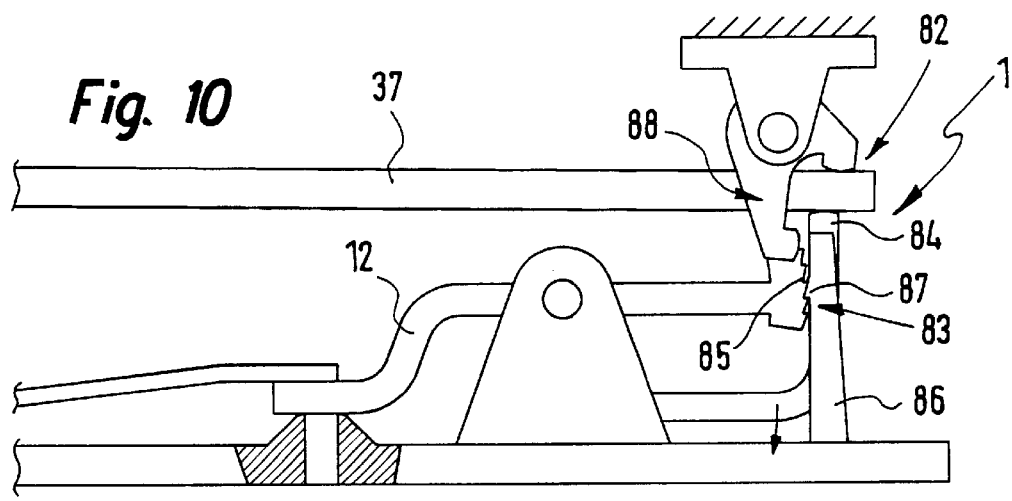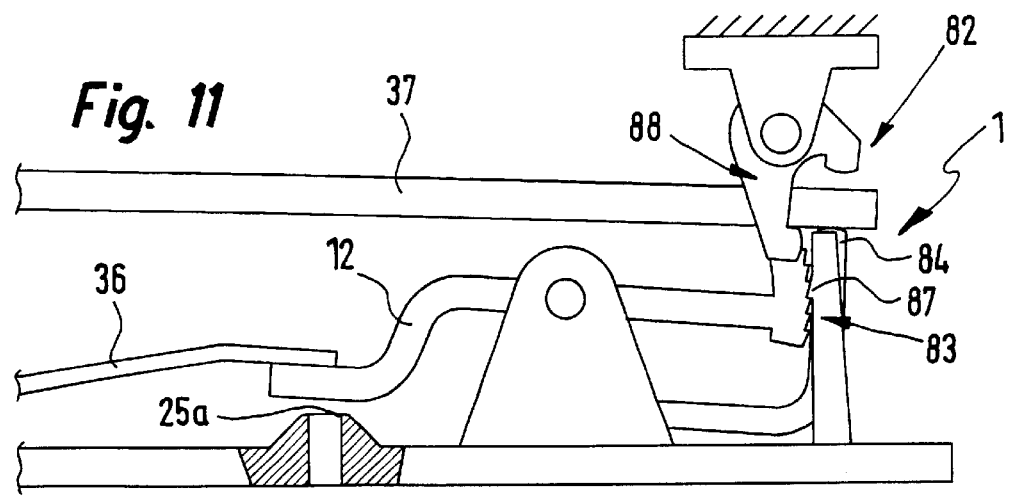

VALVE MEANS

BACKGROUND OF THE INVENTION

The invention relates to a valve means comprising a valve housing, which delimits a control chamber, into which a plurality of fluid ducts open and in which a control rocker member is arranged serving for the control of at least one of the fluid duct openings and adapted to be pivoted between at least two terminal positions, its pivotal position being able to be influenced by an electrically activated flexible element, which is adapted to act on an actuating portion of the control rocker member.

THE PRIOR ART

A valve means of this type is disclosed in the European patent publication 0 741 248 A2. Here a control chamber is defined in the interior of the valve housing, in which a pivotally moving control rocker member is arranged, whose actuating portion, which constitutes an extension of the pivot axis, projects from the control chamber of the valve housing. It is possible, for instance, for a piezoelectric flexible element to act on the actuating portion in order to influence the position of pivoting of the control rocker member, which in the interior of control chamber is opposite to two fluid duct openings or ports which it is able to open and close in a manner dependent on the position of pivoting. A similar valve means is also disclosed in the German patent publication (utility model) 29,901,855, in which case however, departing from the design of the said European patent publication 0 741 248 A2 the fluid ducts to be controlled are placed on a longitudinal side of the control rocker member.

In the case of these two known valve means extensive seal means are necessary in order to enable the actuating portion to extend out of the control chamber without leakage and while ensuring pivotal mobility. Furthermore, a mechanical biasing effect on any piezoelectric flexible element employed for operation is needed in order to bias the control rocker member in the home position into one of its two terminal positions. Mechanical relaxation of the flexible element may mean that functional defects occur.

A similar problem arises in the case of valve means in accordance with the U.S. Pat. No. 5,779,218, wherein for setting a predetermined terminal position the piezoelectric flexible element is subjected to a biassing force and then cast in the position assumed.

Therefore there has already been a suggestion in the European patent publication 0 547 022 B1 to deal with the relaxation problem by means of a mechanical spring acting on the piezoelectric flexible element for compensation. However this leads to a greater overall height of the valve means.

SHORT SUMMARY OF THE INVENTION

One object of the present invention is to create a valve means of the type initially mentioned, in the case of which the relaxation problem is dealt with, at least to a substantial extent, using a simple and compact valve structure.

In order to achieve these and/or other objects appearing from the present specification, claims and drawings, in the present invention the control rocker member including its actuating portion is accommodated in the control chamber and is biased by spring means without involvement of the flexible element into a first one of the two terminal positions, the flexible element in a non-electrically-excited condition within the control chamber being substantially free of mechanical stress and without spring bias, engaging the actuating portion of the control rocker member in the first terminal position of said member.

This means that when the flexible element is deactivated the control rocker member is biased toward a terminal position, the spring forces employed for this being transmitted to the control rocker member independently of the flexible element so that the flexible element itself can engage the control rocker member when it is essentially free of mechanical stresses and therefore of relaxation and no spring bias, acting on the flexible element, is required for compensation of any relaxation tendency. The valve means may consequently be relatively simply assembled, because the flexible element may be installed completely free of bias or at least with only a small bias, something which may take place simply by laying it in place. Since furthermore the flexible element cooperates within the control chamber with the control rocker member, there are no problem sealing areas between the control rocker member and the valve housing. The valve means may all in all be designed with extremely compact dimensions.

Further advantageous developments of the invention are defined in the claims.

As an electrically activated flexible element use is more particularly made of a piezoelectric flexible element, such a flexible element of memory metal or of bimetal also being possible in principle.

On the basis of the valve means it is possible to create different types of valve inexpensively, as for example valves with a "normally closed" characteristic and a "normally open" characteristic.

In the case of a preferred embodiment the control chamber has two fluid openings controlled by the control rocker members, which each communicate with a separate fluid duct and which close and open alternatingly in the two terminal positions of the control rocker member, the closure of one respective fluid duct opening causing simultaneous clearing of the respectively other fluid duct opening. In this respect the two controlled fluid duct openings are preferably controlled by different rocker arms of the control rocker member and therefore, in the case of there being a multi-part valve housing, they can be arranged on the same housing part on the same side of the control rocker member.

It is convenient for the control rocker member to bear a sealing material layer in the portion cooperating with the respective fluid duct opening for control, the control rocker member preferably being borne in a pivotally movable fashion on a fulcrum point on the housing and in the pivotal supporting part has a material layer identical to the layer of sealing material as regards material and thickness, such material layer being more particularly made coherently with the layer of sealing material. This means that any swelling of the sealing material will not have any effect on the valve gap present between the control rocker member and the valve duct opening to be controlled. Since swelling of the sealing material simultaneously results in identical swelling of the material layer present in the supporting portion, there is merely a parallel displacement of the control rocker member, something which is practically devoid of effect on the valve gap.

It is convenient for the arrangement to be such that starting at a point of attachment, which as regards the control rocker member is spaced transversely from its pivot axis, the flexible element extends toward the control rocker member, it partially overlapping the control rocker member on the side opposite to the at least one fluid opening to be controlled. The actuating portion, cooperating with the flexible element, of the control rocker member may here be arranged on the side, opposite to the point of attachment, of the pivot axis at a distance from same. In this respect there is a preferably a provision such that the spring means on the side, opposite to the actuating portion, of the pivot axis engage the rocking control member.

In this respect there is preferably a provision such that by having different lever lengths an optimum adaptation to the stroke-force characteristic of the flexible element may be achieved.

The point of attachment of the flexible element may in case of need be arranged directly within the control chamber. In the case of a design, which is also advantageous, the point of attachment is located in an attachment chamber, adjacent to the control chamber, in the valve housing, from which the front terminal section of the flexible element extends into the control chamber. The attachment chamber may for example be filled with a potting or casting composition in order to lock the flexible element in position and simultaneously to create a seal for the electrical connections.

It is furthermore an advantage if the home position assumed in the electrically non-excited condition, by the flexible element corresponds to that position, which the flexible element assumes on assembly of the valve means simply on the basis of its weight, after it has been placed on the actuating portion of the control rocker member and on at least one fulcrum point on the housing. In this case it is possible to achieve fitting of the flexible element free effects due to manufacturing errors, without play and free of the need for later adjustment, simply on the basis of its own weight.

The spring means predetermining the selected terminal position of the control rocker member are preferably arranged directly in the control chamber. In this respect the spring means may be so designed that they simultaneously perform a holding function for the control rocker member. It is more particularly an advantage for the spring means to act on the control rocker member with a spring force parallel to the actuating force of the flexible element.

In the case of a form of the invention, which is particularly simple to manufacture, the spring means comprise at least one spring lug anchored at one end on the housing and at the other end on the control rocker member, the spring lug being part of a spring unit, which is able to be secured to the housing by way of an anchoring section. It is convenient for the entire spring unit, in the case of which the anchoring section and the spring lug are preferably made integral, to be fashioned of resiliently elastic material, for example of spring steel.

In the case of a further embodiment of the spring means the spring force employed for biasing the control rocker member is obtained using torsion rod elements aligned in the same direction as the pivot axis and which extend between control rocker member and the valve housing and which are preferably able to define the pivot axis directly. The attachment of the torsion rod element on the housing can be using attachment parts, which are held between the holding faces of two parts of the valve housing. Here it is possible for the control rocker member, the torsion rod elements and the attachment parts to be designed in the form of an integral component group. Furthermore, the arrangement is preferably such that the holding valve housing so act upon the attachment parts that on the one hand the control rocker member is urged into the first terminal position and on the other hand there is an additional twist of the torsion rod elements in order to produce the desired biasing force.

The holding faces cooperating with a respective attachment part are best installed on the one hand on a bottom part and on the other hand on a top part of the valve housing, the bias being obtained directly on assembly of the two housing parts.

The flexible element can be a component of a drive means for the control rocker member, which furthermore has means in order to permit a step by step pivoting of the control rocker member, the corresponding means defining for instance a ratchet mechanism or a self-locking mechanism. This means that it is possible to use relatively small setting forces of the flexible element and small pivoting strokes of the flexible element to serve large valve seat diameters with the resulting large setting forces and opening strokes. In this respect the design may be such that after a single operation by the flexible element the control rocker member opens by one pivotal step and after renewed operation closes again in order to realize a bistable valve function.

Taken together the control rocker member and the associated spring means can be termed a first control unit. In addition to this first control unit a suitably designed second control may be present, which serves to control at least one further fluid opening or port, the control rocker members of both control units being able to be actuated jointly by the flexible element. Then the design may be such for instance that the valve means performs a 3/3 valve function. Preferably, the second control rocker member is arranged in a bilaterally symmetrical manner in relation to the first control rocker member on the opposite side of the flexible element.

It is an advantage for adjustment means to be present, which render possible a variable presetting of the position, assumed in relation to the fluid duct openings to be controlled, of the pivot axis of the control rocker member. The valve gap may be adjusted in this way. This can preferably also be performed even without the flexible element during assembly of the valve means and is more especially appropriate, when the valve means possesses two control rocker members.

If means are present, which render possible a stepless application of the actuating voltage for the flexible element, it is extremely simple to provide for any continuous control of the control rocker member, any desired positions of pivoting being able to be preset as required.

Further advantageous developments and convenient forms of the invention will be understood from the following detailed descriptive disclosure of several embodiments thereof in conjunction with the accompanying drawings.

LIST OF THE SEVERAL VIEWS OF THE FIGURES

FIGS. 9 to 11 show a further embodiment of the valve means which is fitted with a ratchet mechanism for performing step by step pivotal motion of the control rocker member, the figures showing different positions of switching.

DETAILED ACCOUNT OF WORKING EMBODIMENTS OF THE INVENTION

Figure 1:
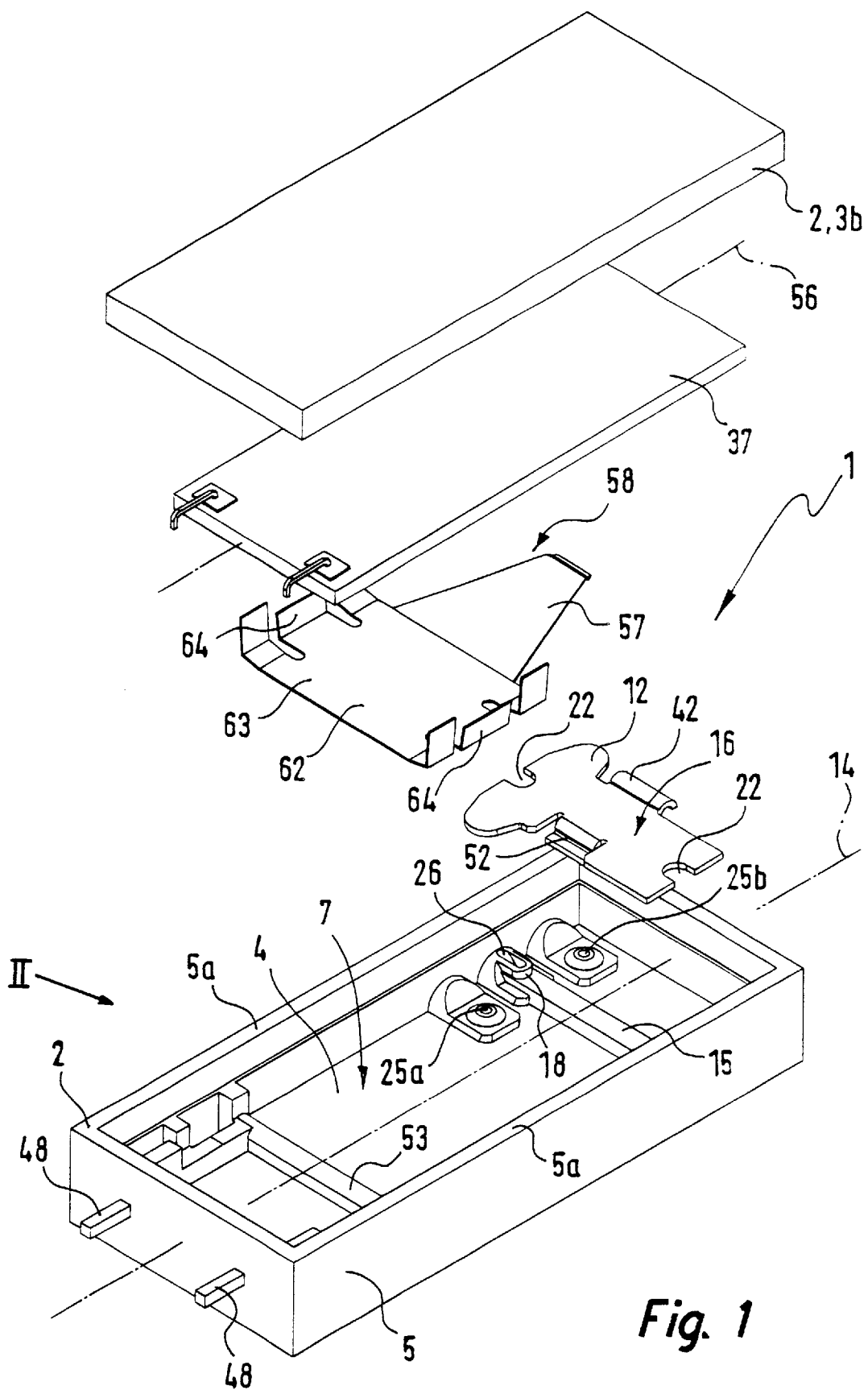
FIG. 1 shows a preferred embodiment of the valve means of the invention in a perspective, exploded view.

Referring firstly to the embodiment of FIGS. 1 through 7, it will be seen that the valve means 1 depicted here possesses a valve housing 2, which is preferably in the form of a parallelopipedon and for instance has a relatively flat configuration. Such housing 2 is preferably manufactured of plastic material and has a multi-part design. In the working embodiment it is composed of a bottom part 3a and a top part 3b, the bottom part possessing a rectangularly shaped floor 4 with a surrounding peripheral side wall 5 extending up from the edge thereof.

On the top side opposite to the floor 4 the side wall 5 is stepped by being provided with a ledge which preferably extends around it so that a receiving means 6 is defined, into which the top part 3b is inserted which constitutes the cover and is preferably designed like a plate. Preferably by a joint connection as for instance bonding or welding the bottom part 3a and the top part 3b are fixed together in a fluid-tight fashion so that the intermediate positioning of a separate seal is unnecessary.

The valve housing 2 defines in its interior a shallow or flat, elongated housing interior space 7, which is divided up into two sections placed in sequence in the longitudinal direction, which in the following will be referred to as the control chamber 8 and the attachment chamber 9. The major part of the length of the interior space is here occupied by the control chamber 8.

In the front portion of the control chamber 8 opposite to the attachment chamber 9 a rocking, pivoting component is placed, which serves for control of fluid flows and consequently is termed a control rocker member 12. This control rocker member 12 is located completely within the control chamber 8 and is able to be pivoted about a pivot axis 13 in relation to the valve housing 2, such axis extending perpendicularly to the longitudinal axis 14 of the valve housing 2 and in parallelism to the plane of extent of the floor 4.

The pivot axis 13 is in the working embodiment defined by providing a fulcrum ledge 15 on the inner side 4 at a fulcrum point, on the housing, such fulcrum ledge 15 extending athwart the longitudinal axis 14 and being shaped like a dome, its upwardly directed face being radiussed slightly if desired, the control rocker member having its fulcrum portion 16, which constitutes the pivoting center, placed thereon for pivoting motion as indicated by the double arrow, like a see-saw to one side or the other.

In order to fix the control rocker member 12 in position and to prevent slipping thereof, it interlockingly engages securing means 18 on the housing so as to ensure the possibility of pivoting. In the working embodiment illustrated these securing means 18 comprise projections, which are formed at the two terminal portions in the direct vicinity of the inner face of the two lateral side walls 5a of the valve housing 2 and fit into marginal recesses 22 of the plate-like, flat control rocker member 12.

The control rocker member 12 possesses a first and a second rocker arm 23a and 23b arranged on either side of the pivot axis 13. If the control rocker member 12 is pivoted, one respective one of the rocker arms will move toward the floor 4 of the valve housing 2, whereas the other rocker arm, like a two-armed lever, will be lifted from the floor 4. The control rocker member 12 is in this case a rigid component as such.

A plurality of fluid ducts 24 open into the control chamber 8, there being three thereof in the working example, which at one end extend to the outer face 2 (not illustrated), where further fluid ducts may be connected, as for instance in the form of fluid lines.

At least one of the fluid duct openings in the interior of control chamber 8 is under the control of the control rocker member 12 as regards the passage of fluid. In the working embodiment two fluid ducts 24 are provided, each having a controlled fluid duct opening, which will be termed the first and the second controlled fluid duct opening 25a and 25b. The third fluid duct opening 26 is open at all times.

The first controlled fluid duct opening 25a is opposite to the first rocker arm 23a while the second controlled fluid duct opening 25b is opposite to the second rocker arm 23b. This means that the two controlled fluid duct openings 25a and 25b may be controlled by different rocker arms of the control rocker member 12 as regards their opening cross section. Preferably, the two controlled fluid duct openings 25a and 25b are on the same side of the control rocker member 12, a rocker face 27, on the control side, being opposite to them, which extends over both rocker arms 23a and 23b and at the same time extends athwart the control rocker member 12. The controlled fluid duct openings 25a and 25b are consequently covered over by the control rocker member 12 on the same side thereof and are located on one and the same valve housing part, in the present case on the floor 4 of the bottom part 3a.

The controlled fluid duct openings 25a and 25b and also the fulcrum point, defined in the working example by the fulcrum ledge 15, are accordingly located on the same housing part.

Figure 6:
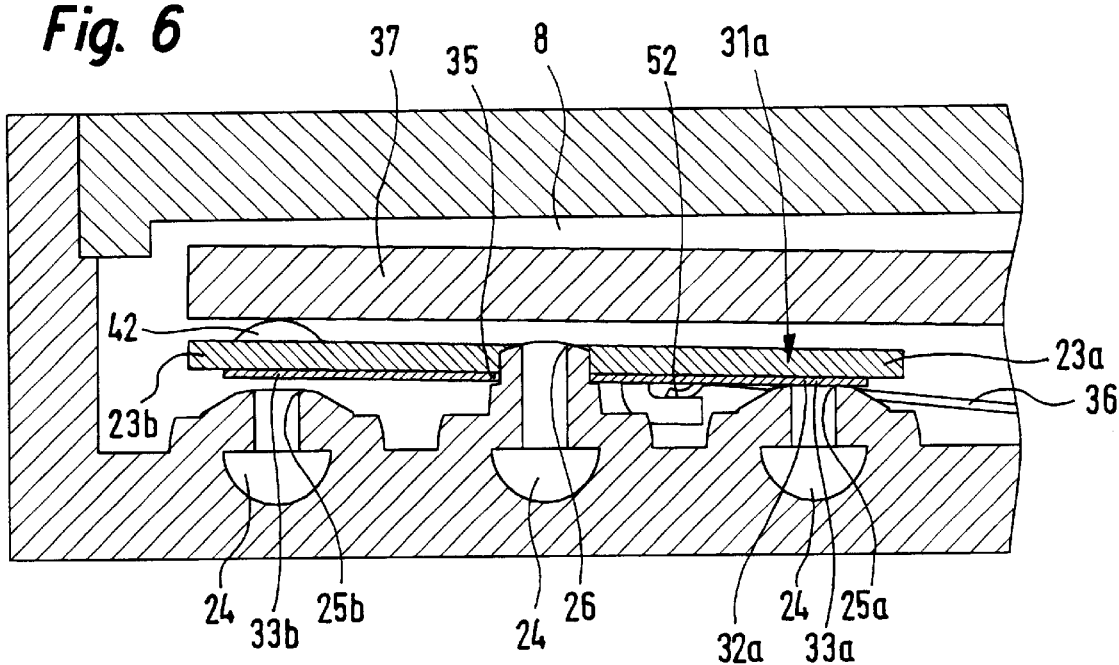
FIG. 6 shows the front terminal portion of the valve means of FIG. 4 adjacent to the control rocker member on a larger scale.
Figure 7:
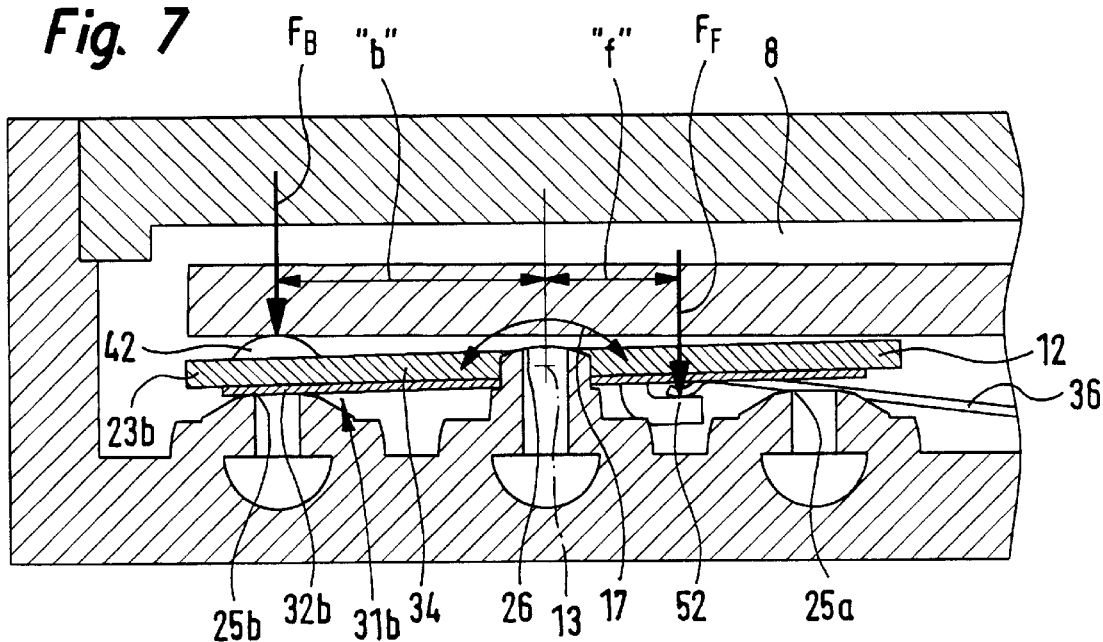
FIG. 7 shows the part of the valve means as in FIG. 6 with the flexible element electrically excited and correspondingly with the control rocker member pivoted into the second terminal position.

Pivoting of the control rocker member 12 about pivot axis 13 as indicated by the double arrow 17 positions the control rocker member alternatingly in two terminal positions. In the first terminal position 31a as shown in FIG. 6 the control rocker member 12 has a first closure portion provided on the first rocker arm 23a resting inside the first controlled fluid duct opening 25a and closes same in a fluid-tight fashion. In the opposite second terminal position indicated in FIG. 7 the control rocker member 12 has a second closure portion 32b, provided on the second rocker arm 23b, resting with sealing engagement on the second controlled fluid duct opening 25b. In this case the respectively other rocker arm is simultaneously and at all times lifted clear of the controlled fluid duct opening associated with it so that same is cleared. By suitable pivotal positioning it is hence possible for the two controlled fluid duct openings 25a and 25b to be alternatingly closed and opened, the closing of the respectively one fluid duct opening occurring with the opening of the respectively other fluid duct opening.

The valve means 1 may for example be designed as a 3/2 way valve. In this case a pressure medium, as for example compressed air, is continuously supplied by way of the fluid duct associated with the first controlled fluid duct opening 25a. The fluid duct 24 associated with the second controlled fluid duct opening 25b is designed as a venting duct and communicates with the atmosphere. The fluid duct running from the continuously open third fluid duct opening 26 constitutes a power duct and may be connected with a load, as for example a drive to be operated by fluid force.

Accordingly the power duct in the first terminal position 31a is vented by way of the second controlled fluid duct opening 25b, whereas simultaneously the supply duct leading to the first controlled fluid duct opening 25a is closed. In the second terminal position 31 on the contrary the venting duct is closed and the supply duct is connected by way of the opened first controlled fluid duct opening 25a with the open third fluid duct opening 26 of the power duct. Accordingly it is possible for the pressure medium to flow between the respectively open fluid duct openings, that is to say through the control chamber 8.

The two closure portions 32a and 32b are respectively constituted by a layer of suitable sealing material, which will be termed the first and the second sealing material layer 33a and 33b, same being applied to the corresponding side on a principal body 34 of the control rocker member 12, such layer best being manufactured of metal. The rocker face 27 on the control side is accordingly at least partially constituted by the surface of the sealing material layers 33a and 33b.

A particular advantage of the control member 12 is that the principal body 34 is also provided with a material layer 35 at the pivot or fulcrum point, with layer is the same the respective sealing material layers 33a and 33b as regards material properties and thickness of the layer, the rocker member 12 having the material layer 35 resting on the top side of the fulcrum ledge 15.

The design is preferably such that the sealing material layers 33a and 33b are made integrally with the material layer 35, a uniform sealing material layer being applied, which at least to a major extent can form the rocker face 27 on the control side.

During operation of the valve means undersized changes may occur in the thickness of the layers of sealing material, as for instance swelling. This is something which would normally cause a change in the distance from the associated controlled fluid duct opening 25a and 25b. Since however a suitable material layer is applied at the bearing point as well, the alteration in thickness of the sealing material is automatically compensated because the entire control rocker member is lifted and accordingly the gap between the sealing material and the fluid duct opening 25a and 25b forming the seal seat is not changed. The effects of thermal expansion on the gap in the open position remains minimal, since the respective length of the material, that is to say the height of the edges of the control rocker member over the valve seats, may be kept extremely small. A further point is that even a bending of the housing parts 3a and 3b due to the internal pressure obtaining in the control chamber 8 is automatically compensated for because the pivot or rocking point of the control rocker member moves as well. Manufacturing inaccuracies in the size of the gap between the two housing parts 3a and 3b has no effect at all on the function of the valve means, since all relevant components are mounted on the bottom part 3a and the top part 3b has no influence on the functional parts of the valve, that is to say not on the functional parts to be described below.

The valve means 1 is furthermore provided with spring means 36, which like the control rocker member 12 are completely accommodated in the interior of the control chamber 8 and are directly effective between the valve housing 2 and the control rocker member 12. The spring means 36 bear on the one hand against the valve housing 2 and on the other hand act on the control rocker member 12 in such a fashion that it is biased into one of the terminal positions without the cooperation of the flexible element still to be described, this terminal position being in the working example the first terminal position 31a. This simultaneously corresponds the home position, which is assumed by the valve means 1 in the deactivated state.

The spring means 36 act with a spring force $F_F$ at a distance from the pivot axis 13 on the control rocker member 12, which is termed the first lever arm "f". The torque generated by this cocks the control rocker member 12 into the first terminal position 31a.

In order to switch over the control rocker member 12 into the other, second terminal position 31b, by means of the electrically activated flexible element 37 of a drive means 38 integrated in the valve housing 2 an actuating force $F_B$, which produces an opposite torque, which is caused to act on the control rocker member 12. The transfer of the force takes place at an actuating portion 42 of the control rocker member 12, which is placed spaced a certain distance, termed the second lever arm "b", from the fulcrum portion 16.

The design is such that the points of the application of the spring $F_F$ and the actuating force $F_B$ are located on diametrally opposite sides of the pivot axis 13 in order to act in the opposite direction of pivoting on the control rocker member 12.

The above mentioned flexible element 37 could for instance be made of so-called memory metal, which at ambient temperature assumes a home position, out of which it is deflected, when it is heated by an electric current and into which it returns when it cools following interruption of the electric current. Preferably however the flexible element 37 as in the embodiment is a piezoelectric element, that is to say a beam-like flexible transducer, which is fixed and secured at the rear end, its front terminal portion being deflected, on the application of a current, athwart its longitudinal axis to the side.

Figure 4:
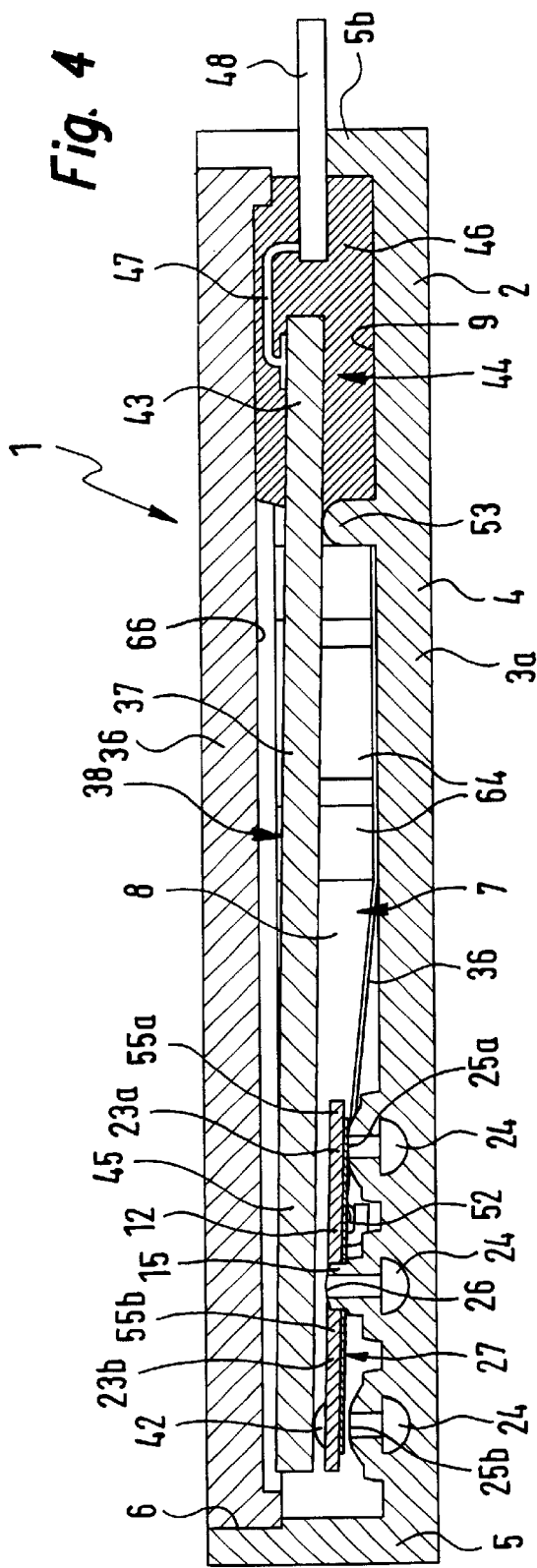
FIG. 4 shows the valve means of FIGS. 1 through 3 in longitudinal section and in the home position with the flexible element electrically excited, on the section line IV—IV of FIG. 3.
Figure 5:
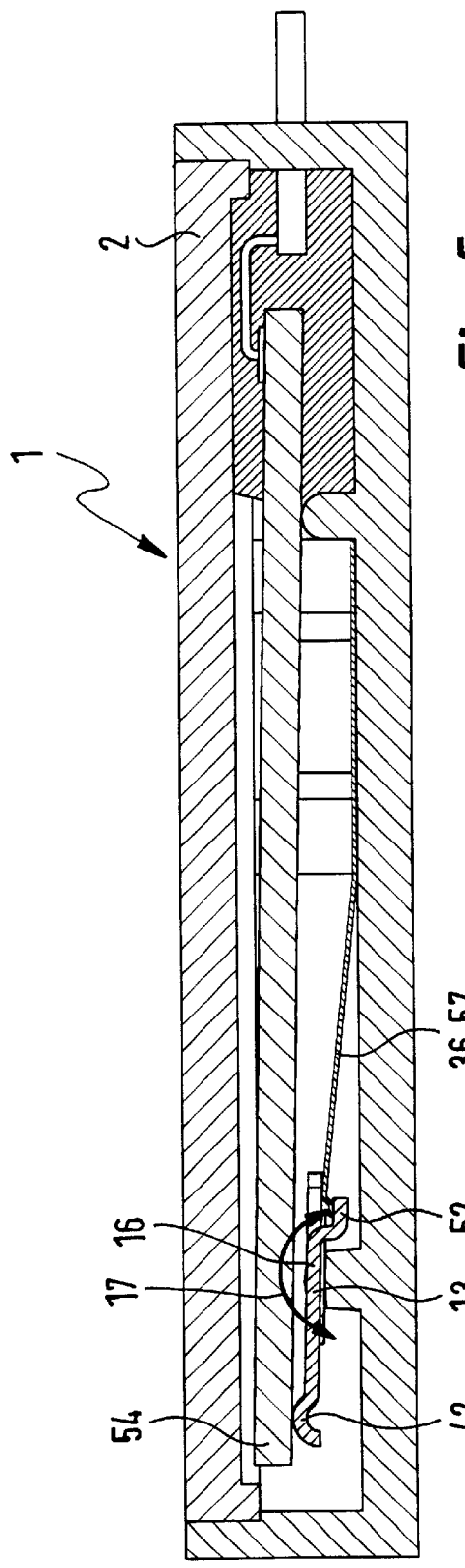
FIG. 5 shows the valve means in accordance with FIGS. 1 through 3 in a manner of representation like that of FIG. 4, taken on the section line V—V of FIG. 3 as a longitudinal section.

As shown in FIGS. 4 and 5 clearly the flexible element 37 extends generally in the longitudinal direction of the valve housing 2 and is accommodated in the interior space 7 of the housing. It is securely fixed at its rear terminal section 43 at an attachment point 44, provided in the attachment chamber 9, whence its front terminal section 45 extends into the control chamber 8 toward the control rocker member 12.

The anchoring of the flexible element 37 in the attachment chamber 9 is ensured in the working embodiment by means of a potting composition 46 filling the attachment chamber 9 and thus surrounding the rear terminal section 43 of the flexible element 37. The potting composition can also at the same time encapsulate the electrical connecting lines 47 and the associated connection points, by way of which a connection is produced with the electrical connection contact means 48, which extend through the rear side wall 5b of the valve housing 2 to the outside in order to render possible the application of an operating voltage.

In the working embodiment the point 52 of application of spring force for the spring means 36 is placed on the longitudinal side, facing the rear terminal section 43, of the pivot axis 13 and, respectively, the fulcrum portion 16. The actuating portion 42 which in the embodiment is in the form of a raised portion, of the control rocker member 12, is on the longitudinal side, opposite to the attachment point 44, of the fulcrum portion 16. Accordingly the control rocker member 12 is at least partially overlapped by the flexible element 37 on the top side opposite to the control side rocker face 27. The control rocker member 12 can in this case be completely overlapped by the front terminal section 45 of the flexible element 37.

The design of the valve means is such that the flexible element 37 assumes a home position as indicated in FIG. 4 in its electrically non-excited state, that is to say when the operating current is not applied, in which position it rests at least essentially free of mechanical stress within the control chamber 8—that is to say at completely free of stress or with merely an extremely small bias—on the actuating portion 42, when same assumes the first terminal position 31a as set by the spring means 36. In this respect it is relevant to note that the spring means act directly on the control rocker member 12 without the flexible element being in between without and the flexible element 37 itself being subject to spring bias. The actuating force $F_B$ applied by the flexible element 37 in the home position to the control rocker member 12 is therefore equal to zero.

It is only when the desired operating voltage is applied by way of the electrical connection contacts 48 to the piezoelectric flexible element, that the tendency of the flexible element 37 to flex or bend produces the actuating force $F_B$, which causes a switching over or, respectively, pivoting of the control rocker member 12 out of the stressed first terminal position 31a into the second terminal position 31b.

If the operating voltage is discontinued again and the flexible element 37 is unloaded, the flexible element 37 will return into the home position and the control rocker member 12 is simultaneously switched by the spring means 36 into the first terminal position 31.

The valve means 1 is in the working example designed with a so-called "normally closed" characteristic, the spring means 36 closing the first controlled fluid duct opening 25a, supplying a supply pressure, with the valve means 1 deactivated. By simply changing over the duct functions of the two controlled fluid duct openings 25a and 25b it would be readily possible to also create a valve means with a "normally open" characteristic.

The mechanically bias-free state of the flexible element 37assuming the electrically non-excited home position may be very easily set on assembly of the valve means. The said home position in fact corresponds to that position of the flexible element, which same firstly assumes in which it is placed during assembly of the valve means 1 with the top part 3b removed in the bottom part 3a already fitted with the control rocker member 12 and the spring means 36. Then the front terminal section 45 of the flexible element 37 is placed on the actuating portion 42 while its rear terminal section 43 is placed on a fulcrum portion 53 provided inside the interior space 7 of the housing, on the bottom part 3a. The fulcrum portion 53 is in this case preferably so designed that together with the actuating portion 42 it constitutes a three point fulcrum portion for the flexible part 37 laid on it. The fulcrum portion 53 may be in the form of a raised part of the floor extending athwart the longitudinal axis 14 and which simultaneously functions as a partition wall between the attachment chamber 9 and the control chamber 8.

The suitably laid on flexible element 37 then acts simply by its weight on the actuating portion 42. In this condition the rear terminal section 43 is secured in the manner already described so that the above mentioned mechanical condition free of stress of the flexible element 37 is established.

Since the two controlled fluid duct openings 25a and 25b, which are best designed in the form of valve seats are arranged on the same side of the control rocker member 12 on one and the same housing part 3a, for the production and assembly the relevant chain of manufacturing inaccuracies only comprises one inaccuracy item. Swelling of the sealing material provided on the control diaphragm, the mechanical bending of the housing and the manufacturing inaccuracies on assembly of the two housing parts 3a and 3b are practically devoid of influence on the ability of the valve to function. Furthermore, relaxation of the piezoelectric flexible element 37 and the accompanying harmful reduction in the switching stroke of the control rocker member 12 are avoided, it being an advantage that the spring means 36 do not act on the piezoelectric flexible element 37, but rather directly on the control rocker member 12. There is no need for elaborate pre-biasing of the piezoelectric flexible element, as is for example described in the said U.S. Pat. No. 5,779,218, and since a certain switching position—either a closed position or an open position—may be set for the home position of the flexible element 37 by means of the spring bias of the control rocker member 12, without having to bias the piezoelectric flexible element mechanically for this, it is also possible to dispense with any spring bias of the piezoelectric flexible element 37 serving for compensation of relaxation, be this by mechanical or be it an electrical action on the flexible element 37. The result is again the flat shape of the valve housing 2 clearly indicated in the drawings.

A still further advantage of the valve means 1 as described is that the valve seats constituted by the controlled fluid duct openings 25a and 25b do not have to be adjusted separately in relation to the flexible element 37. Furthermore, the unavoidable production inaccuracies in thickness of the flexible element 37, that is to say the variations in dimensions in the pivot plane, are without influence on the summated chain of inaccuracies.

Moreover, in the valve means 1 there is the possibility of coordination between the length of the first and the second lever arms "f" and, respectively, "b" to obtain an optimum matching to suit the stroke force characteristic of the flexible element 37. By the use of a control rocker member 12 with different arm lengths it is possible to obtain more mechanical energy from the flexible element 37 so that for the same spring force $F_F$ it is possible to have a larger switching stroke and/or for the same switching stroke a larger actuating force. Trouble-free adaptation to suit the stroke-force characteristic of the flexible element 37 is possible. In this respect the term switching stroke is understood to mean the distance of the closure portions 32a and 32b from the associated controlled fluid duct opening 25 on assuming the open position, present in the terminal position, of the corresponding controlled fluid duct opening. The switching path is consequently dependent on the angle of pivoting or rocking of the control rocker member 12 and on the distance of the closure portions 32a and 32b from the pivot or rocking axis 16. It is thus clear that the distance of the controlled fluid duct openings 25a and 25b from the pivot axis 13 may be selected to be different in order to have different and suitably chosen switching strokes for differently selected diameters of the controlled fluid duct opening 25a and 25b The switching behavior of the valve means 1 may be also influenced by the use of force means 36 with a greater or less spring force.

A further advantage of the valve means 1 is that the cooperation of the flexible element 37 with the control rocker member 12 is encapsulated and shut off from the surroundings in the control chamber 8 in the interior of the housing's interior space 7 so that it is not necessary to seal off any moving connection between the control rocker member 12 and outside the housing's interior space 7. It is furthermore advantageous that the flexible element 37 does not perform any sealing function as regards the valve seats or, respectively, controlled fluid duct openings 25a and 25b so that in the area of contact with the actuating portion 32 the flexible element 37 may be of a material which is optimized as regards frictional forces occurring. Friction occur in the said contact area, because the pivoting radius of the actuating portion 32 is smaller than that of the working section 54, which is in contact with the actuating portion 32, of the flexible element 37 so that the latter and the actuating portion 32 slide on each other during the switching operation.

The valve means 1 in the embodiment is characterized in that during assembly and even before installation of the flexible element 37 examination of the sealing effect is possible as regards the correct closure of the controlled fluid duct openings 25a and 25b by the control rocker member 12. Furthermore it is possible, after insertion and fixing of the flexible element 37, but however before the application of the top part 3b causing the final closing of the valve means 1, to check function in order to perform any possibly necessary correction as regards the installed components in good time. There is the useful effect here that the top part 3b has a purely covering function and does not perform a holding function.

In the working embodiment the application of the actuating force $F_B$ to the control rocker member 12 takes place practically at the outermost front terminal portion of the flexible element 37 so that its possible pivotal path of motion may be optimally utilized.

Figure 2:
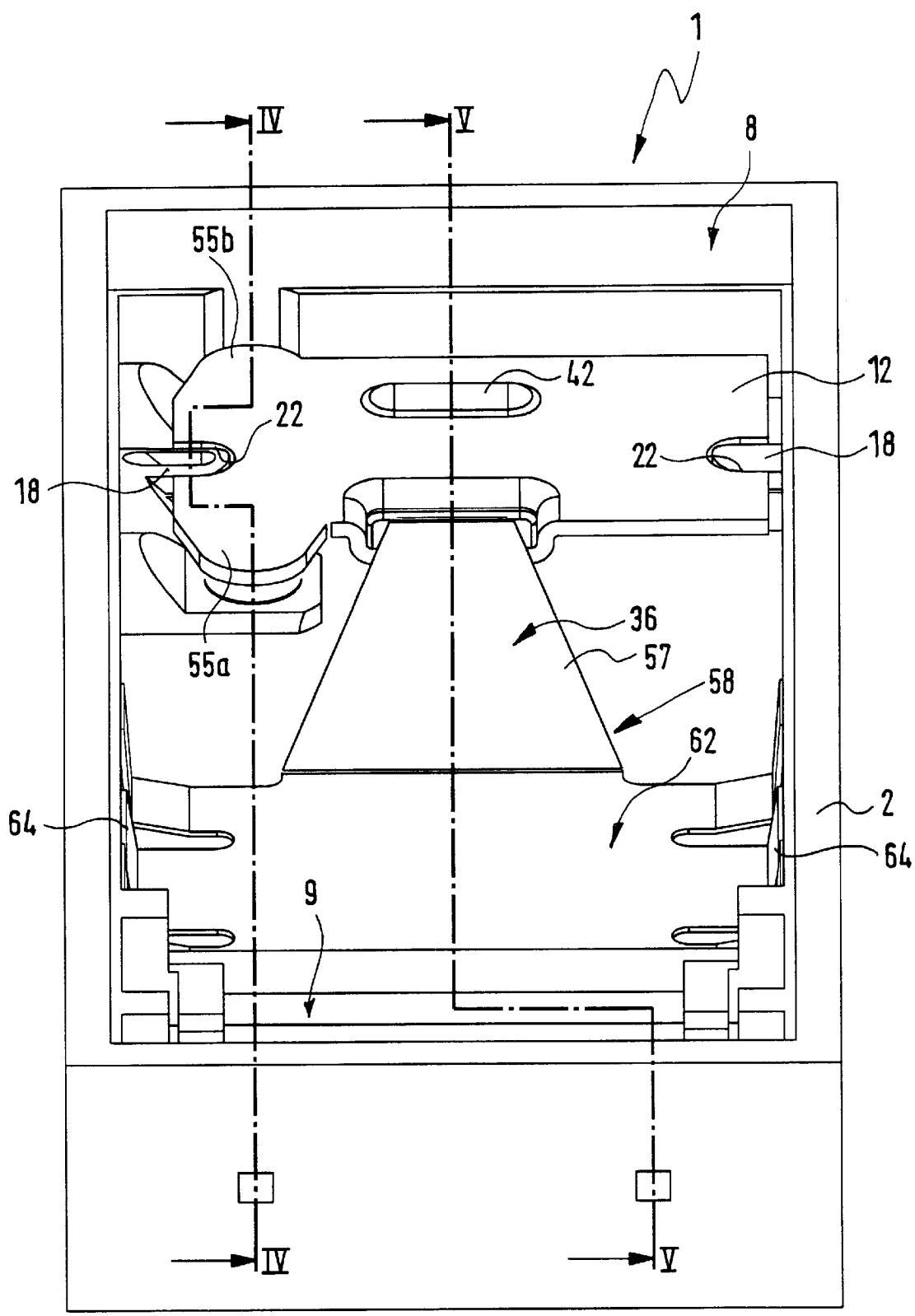
FIG. 2 shows the valve means of FIG. 2 after removal of the top part and of the flexible element in a plan view looking obliquely down onto the device, as indicated by the arrow II in FIG. 1.
Figure 3:
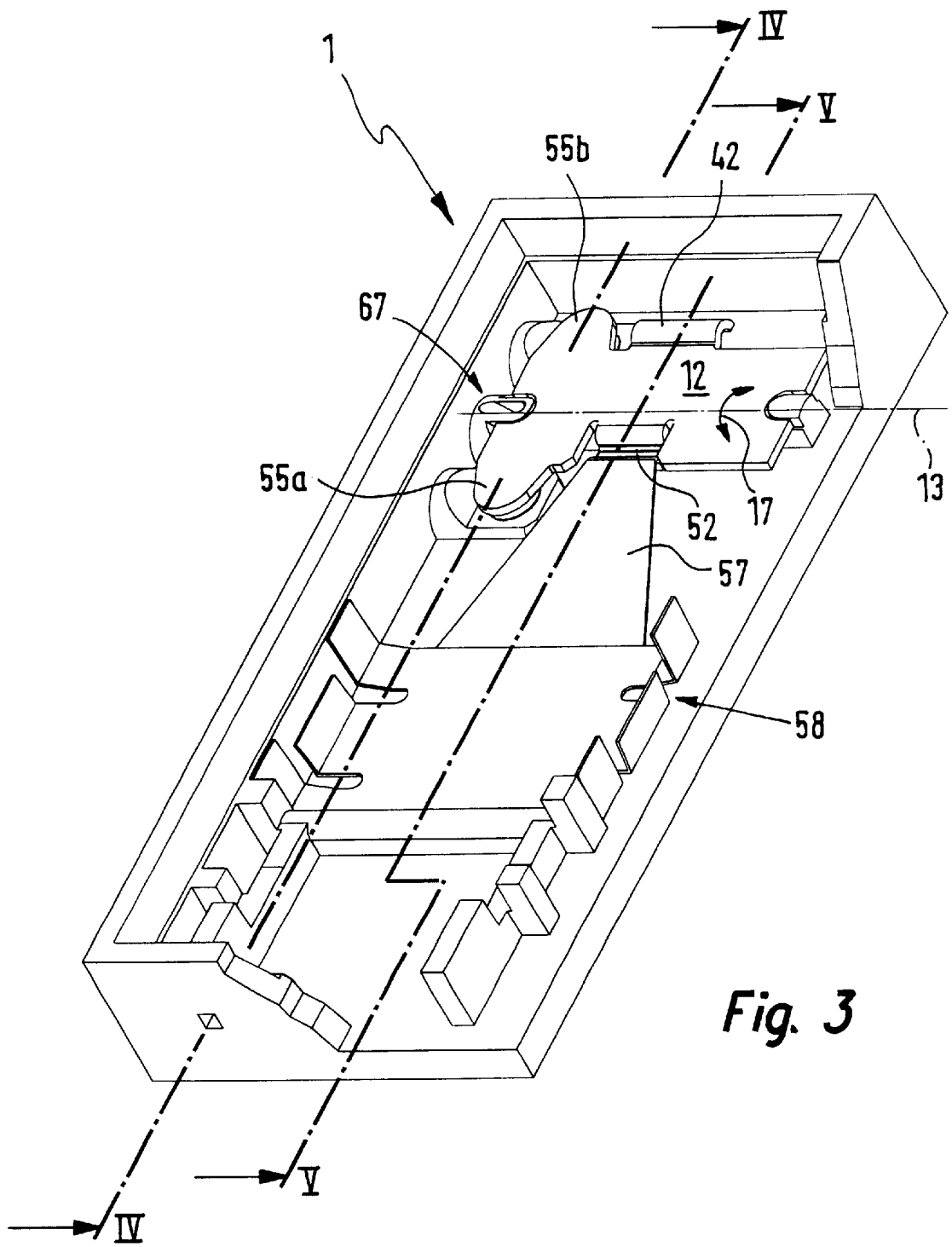
FIG. 3 shows the arrangement of FIG. 2 in a slightly twisted, oblique view with the wall of the valve housing partly broken away.

As shown in FIGS. 1 through 3, the two closure portions 32 are preferably located on first and second control portions 55a and 55b, extending away from the pivot axis 13 like wings in opposite directions which like the controlled fluid duct openings 25a and 25b as well, are placed at a distance to the side and adjacent to the longitudinal axis 14 of the valve housing 2 near one of the two side walls 5a. On the contrary the actuating portion 42 and the point 52 of transfer of the spring force are preferably in the plane of the longitudinal axis 14, in which the longitudinal axis 56 of the flexible element 37 also extends. The design of the closure portions 32a and 32b may consequently take place without being impaired by those regions, in which setting forces are applied to the control rocker member 12.

In the working embodiment of FIGS. 1 through 7 the spring means 36 are constituted by at least one spring lug 57, there being just one such lug in the working example, such lug being a component of a spring unit 58 and being fixed in relation to the housing by being anchored at an anchoring section 62 of the spring unit 58. The spring unit 58 is preferably made as an integral component consisting of resiliently elastic material such as spring steel, the anchoring section 62 having a carrying portion 63 with a flat shape having resiliently elastic claws on either side, the width of the anchoring section 62 in the non-fitted state, and taking the claws 64 into account, being slightly larger than the internal width, measured between the two lateral side walls 5a, of the control chamber 8. The tabular carrying portion 63 is connected integrally with the one end of the spring lug 57 which extends like a lug from the front side of the carrying portion 63.

The spring unit 58 is mounted in the control chamber 8 between the control rocker member 12 and the attachment chamber 9 or, respectively, between the fulcrum point 53 delimiting same. Assembly takes place by inserting the spring unit 58 with the anchoring section over the open top side of the bottom part 3a into the control chamber 8 until its carrying portion 63 contacts the inner face of the floor 4. Then the claws 64 simultaneously come into contact with the inner face of the lateral side walls 5a and are slightly deflected against a restoring spring force and owing to the resulting biasing effect grip the plastic material of the lateral side walls 5. It is in this manner that the spring unit 58 is fixed in the bottom part 3a without additional attached elements.

The spring lug 57 extends forward toward the control rocker member 12 and its front end 65 engages the point 52 of application of spring force on the control rocker member 12.

Prior to fitting in place of the spring unit 58 the spring lug 57 may extend in a single plane with the carrying portion 63 or, however, may slope upward toward its front end 65 slightly. In any case the arrangement will be so designed that the spring lug 57 bears against the control rocker member 12 with the desired spring force $F_F$ when the spring unit 58 is installed.

The control rocker member 12 and the spring lug 57 are accordingly arranged on after the other in a direction athwart the pivot axis 13. This direction can be termed the row alignment direction. The flexible element 37 in this case straddles the spring lug 57 and the control rocker member 12 with an alignment in parallelism to the row direction.

Since the spring unit 58 is anchored in the valve housing 2 and has its front end 65 acting on the control rocker member 12 from above toward the floor 4, there is the advantage that the control rocker member 12 is held by the spring unit 58 and, respectively, the spring means 36 on the valve housing 2. Further holding fixtures are not necessary.

The flexible element 37 best acts directly on the control rocker member 12 without intermediately placed spring means. The spring means 36 responsible for the biasing of the control rocker member 12 into the first terminal position 31a act in such a manner that there is a sort of parallel circuiting of the spring force $F_F$ and the acting spring $F_B$.

The top part 3b, performing the lid or cover function of the valve housing 2, may have one or more recesses 66 which permit pressure medium to flow around the flexible element 37 or to cause a cooling effect behind same in order to counter any undesired adhesion of the flexible element 37 to the top part 3b.

Since the fluid ducts 24 between their openings 25a and 25b in the control chamber 8 and the duct openings (not illustrated) on the outer face of the valve housing 2 may be made relatively short, there is a correspondingly short, optimum path for the fluid.

If required an additional hold function of the top part 3b in relation to the spring unit 58 may be provided for. For this purpose the arrangement may be such that the top part 3b in the inserted state in the receiving means 6, has its inner face, near the edge, acting on the upwardly extending ends of the claws 64 and so holds same in place as a sort of holding down means that the abutment contact between the carrying portion 63 and the floor 4 is ensured.

Figure 8:
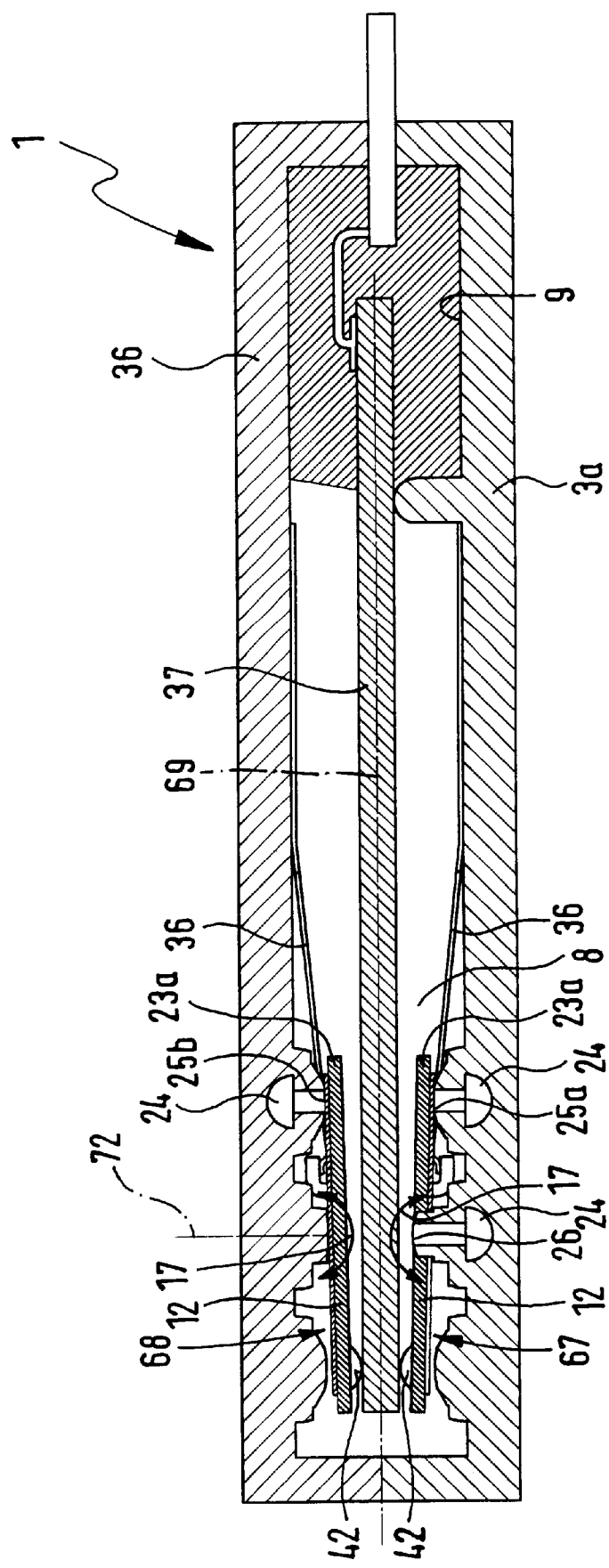
FIG. 8 is a longitudinal section of a further working example of the valve means, which is fitted with two control units to realize a 3/3 way valve.

FIG. 8 indicates a somewhat modified structure of the valve means 1, corresponding components thereof being provided with identical reference numerals.

Whereas in the embodiments of FIGS. 1 through 7 there is merely one single control unit composed of the control rocker member 12 and the spring means 36—this being the first control unit 67—in the interior of the valve housing 2, the working example of the invention in accordance with FIG. 8 discloses an additional second control unit 68, which is designed much like the first control unit 67 and is installed on the longitudinal side, opposite to the first control unit 67, of the flexure element 37. The two control units 67 and 68 are in this case preferably designed and arranged with bilateral symmetry with respect to the plane 69 of extent of the electrically non-excited flexible element 37. In order to ensure optimum accommodation it is possible for the top part 3b here as well to be provided with surrounding side walls 5 like the bottom part 3a.

The modified embodiment is employed to realize special, customized valve functions. In the working embodiment illustrated there is a 3/3 function. Here the two controlled fluid duct openings 25a and 25b are respectively associated with one of the two control rocker members and are best located adjacent to the rocking arm 23a, which is urged by the spring means 36 into the first terminal position so that in the non-excited home position of the flexible element 37 both controlled fluid duct openings 25a and 25b are closed. The always open third fluid duct opening 26 can remain as previously or may be provided at some other position in the control chamber 8, something which also applies for the embodiment in accordance with FIGS. 1 through 7.

It is in this manner that an electrically non-excited home position of the flexible element 37, that is to say a normally closed version of a 3/3 valve, may be produced.

The flexible element 37 is so designed that it may be positively deflected by a suitable polarity of the operating voltage, that is to say moved in two opposite directions. Dependent on the direction of deflection it is possible for one of the so far closed controlled fluid duct openings 25a and 25b to be cleared for connection with the open, third fluid duct opening 26, whereas the other controlled fluid duct opening remains closed.

Owing to the possibility of controlling the flexible element 37, which is more particularly in the form of a flexible transducer, continuously with an actuating voltage, any desired intermediate positions are possible so that the valve means is extremely suitable for positioning and proportional applications. A continuous control by the stepless application of the operating voltage is furthermore also possible in the case of the valve means in accordance with FIGS. 1 through 7.

Due to the opposite arrangement of the two control rocker members 12 problems may occur due to manufacturing inaccuracies on assembly. In order to nevertheless to permit exact assembly and adjustment of the corresponding housing part it is possible for the already preassembled flexible element to be employed as a sensor. If the control rocker member touches the flexible element 37 a voltage pulse will be produced. Accordingly the housing parts or, respectively, the second control rocker member may be applied to the flexible element 37 without bias and free of play.

It is possible as well as indicated in chained lines in FIG. 8 to provide additional setting means 72, which bear against a part of the valve housing 2 and adjacent to the fulcrum ledge 15 so act on the control rocker member 12 that the position of the pivot axis 13 in relation to the fluid duct openings to be controlled is altered. In this case the fulcrum or bearing face on the valve housing, against which the control rocker member 12 bears, is practically adjusted at a right angle to the plane 69 of extent. This means that an even better use of the pivoting path of the flexible element 37 is possible, the adjustment even being possible in the absence of the piezoelectric bending means.

Figure 12:
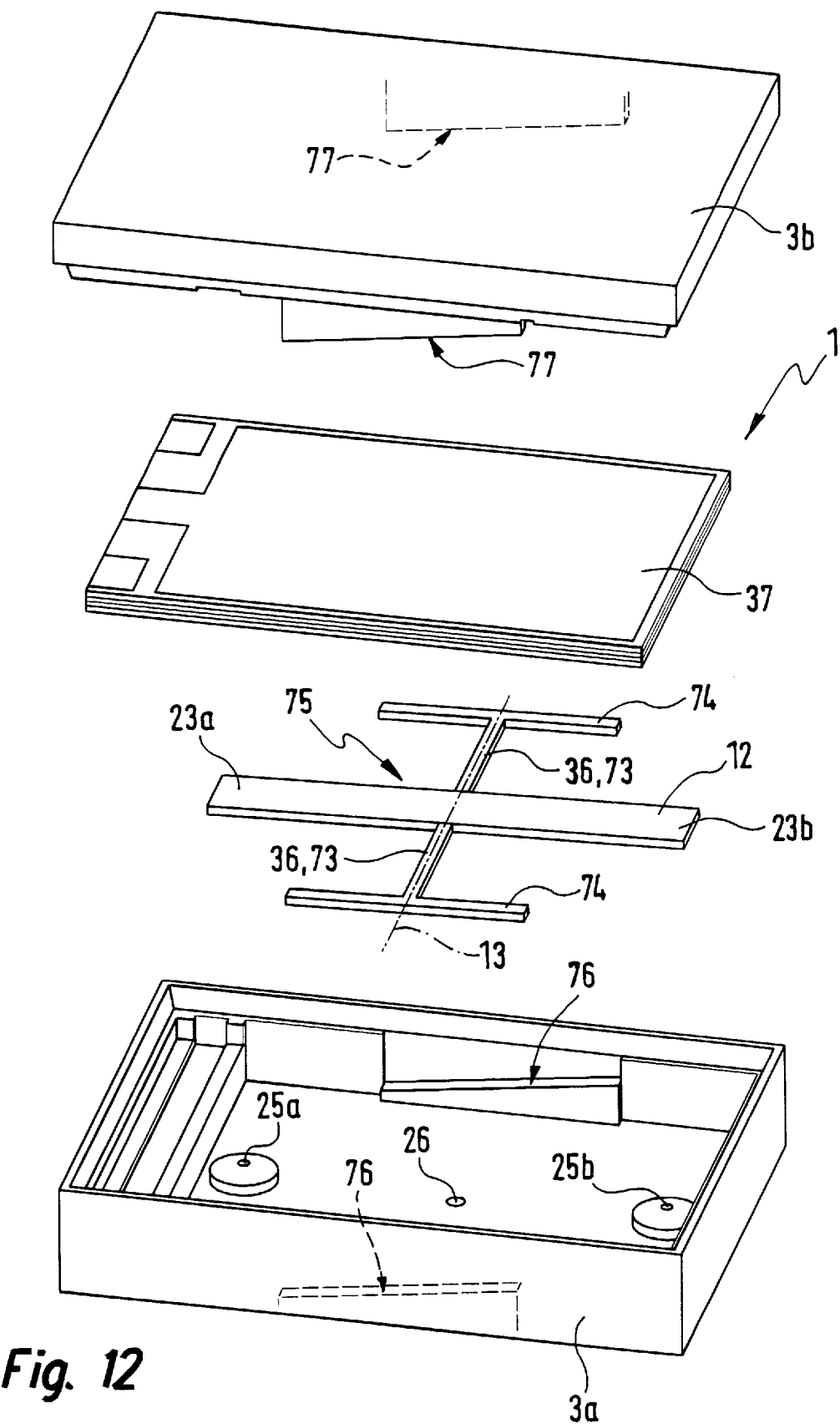
FIG. 12 shows an exploded perspective view of a further working embodiment of the valve means of the invention.
Figure 13:
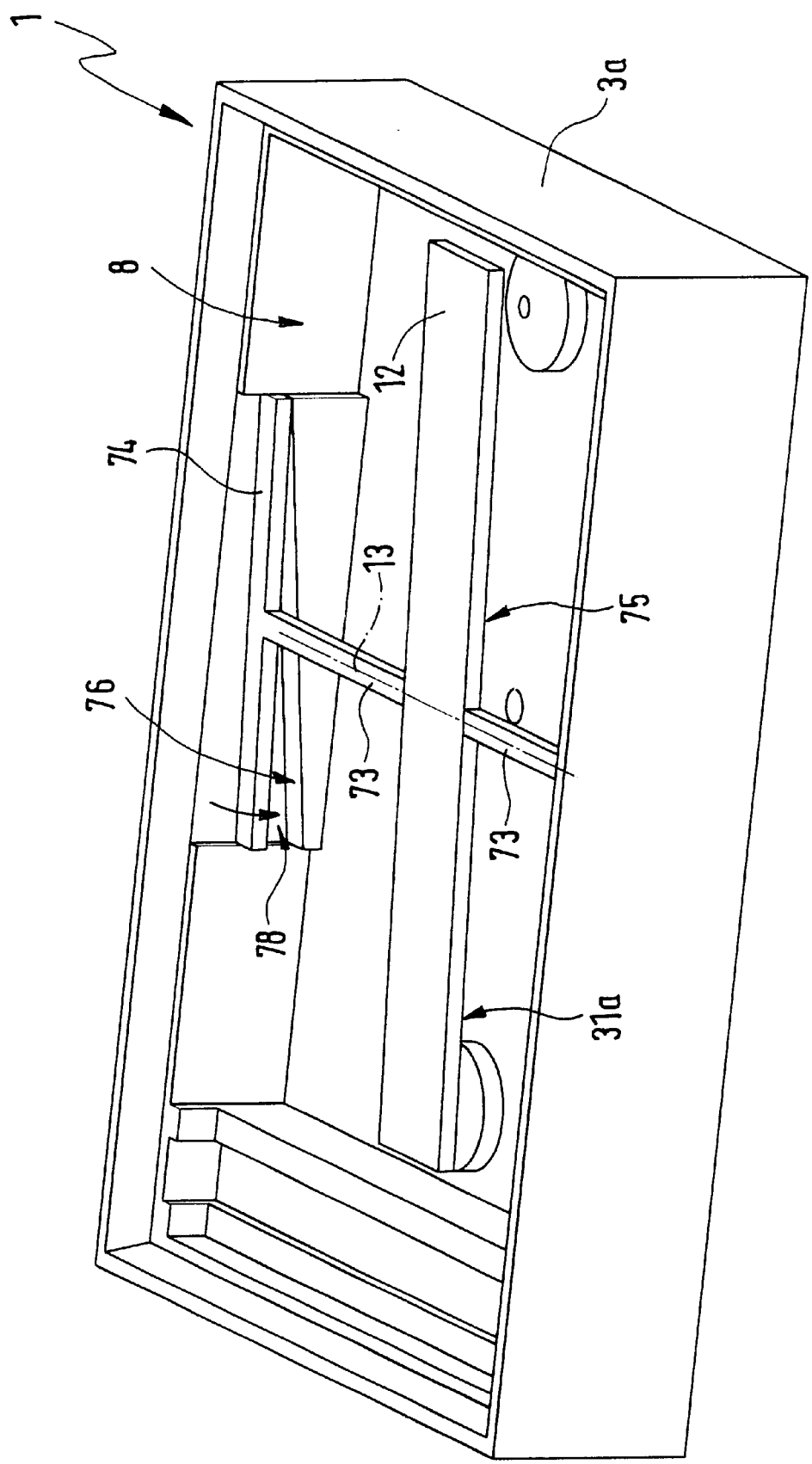
FIG. 13 is an oblique plan view of the valve means of FIG. 12 with the control rocker member laid in position before the installation of the flexible element and of the cover-like top part to be mounted thereon.

In the further working embodiment illustrated in FIGS. 12 and 13 of the valve means mutually corresponding component are again denoted with identical reference numerals. This configuration is more especially characterized by a different design of the spring means 36.

Thus in this case the spring means 36 are constituted by torsion rod elements 73 extending in the same direction as the pivot axis 13 and preferably directly defining the pivot axis. Such a torsion rod element 73 extends from each longitudinal side, aligned with the pivot axis 13, of the control rocker member 12 and in a coaxial manner and such element 73 bears, at its outer end, opposite to the control rocker member 12, an attachment part 74 extending perpendicularly to the pivot axis 13 and being preferably rod-like. In this arrangement the control rocker member 12, the torsion rod element 73 and the attachment parts 74 are best designed in the form of an integral assembly 75 of metal or plastic material. Here there is preferably a provision such that the control rocker member 12 and the attachment parts 74 are arranged in a common plane when in the as yet non-fitted state. The assembly 75 may for this purpose be produced extremely simply as a stamped component.

In the fitted state of the assembly 75 the two attachment parts 74 are respectively held between first and second holding faces 76 and 77 aligned perpendicularly in relation to the pivot axis 13, such holding faces 76 and 77 being provided on the two housing parts 3a and 3b in facing pairs. These holding faces 76 and 77 run obliquely in relation to the plane of extent of the flexible element 37 at a greater angle than the control rocker member 12 when in its terminal position. If therefore the assembly 75 is so placed in the bottom part when assembling the valve means 1 that the first terminal position 31a is produced, there an intermediate space 78 with a wedge taper between the attachment parts 74 and the respectively associated oblique first holding face 76 of the bottom part 3a.

If now following this, after previously laying the flexible element 37 in position, the top part 3b is put on, same will act at the second holding faces 77 downward on the attachment parts 74. Same will then be twisted around the pivot axis 13 as an axis of rotation in relation to the control rocker member 12 held in the first terminal position 31a (the intermediate space 78 gradually closing)until finally the attachment parts 74 have assumed an oblique setting corresponding to the slope of the mutually parallel holding faces 76 and 77. Since the latter is steeper than that of the control rocker member 12, there will be a twisting of the torsion rod elements 73 through a certain angle of rotation in relation to the biased inactive position. This leads to a spring effect, which exerts a torque on the control rocker member 12 and biases same toward the first terminal position 31 with a desired force.

FIGS. 9 through 11 illustrate a part of a further working example of the valve means 1 in various different stages of actuation. In the case of this valve means there is the special feature that the flexible element 37 is a component of a drive means 82 for the control rocker member 12, which possesses positioning means 83 which render possible a rocking movement in steps of the control rocker member 12 and in the working embodiment are designed like a ratchet mechanism. The representations in FIGS. 9 through 11 are furthermore highly diagrammatic and should only be taken to indicate the principles of the system.

The positioning means 83 in the form of a ratchet mechanism render possible pivoting motion of the control rocker member 12 in steps and thus a stepped valve operation. In this case the flexible element 37 repeatedly presses against a moving setting arm 84, which bears first teeth, not illustrated in detail, and which are opposite second teeth provided on the control rocker member 12. Each actuation by the flexible element 37 will mean a displacement of the setting arm 84, the first teeth 85 coming into mesh with the second teeth 85 and turning the control rocker member 12 a certain amount. This actuating operation is indicated in FIGS. 10 and 11.

During pivoting or rocking the second teeth 85 will move along third teeth 87 provided a resiliently elastically pivoting rocking lever 86, which after return movement of the flexible element 37 will remain in mesh with the second teeth 85 in order to hold the instantaneously reached position of pivoting. Every further flexing stroke of the flexible element 37 in this fashion will mean that the control rocker member 12 will be switched through further angular displacements and accordingly a controlled fluid duct opening 25a will be opened in steps.

It is consequently possible despite relatively small actuating forces $F_B$ and small pivotal strokes of the flexible element 37 to serve valve seats of large diameter with large resulting setting forces and switching strokes.

The return motion effected by the spring means 36 of the control rocker member 12 into the initial first terminal position 31 may for example be produced by causing the pivot lever 83 to come out of engagement with the control rocker member 12 on reaching the second terminal position of the control rocker member 12, the control rocker member 12 then springing back.

The switching operation can be performed without movement in steps (instead of one in steps), if in place of a ratchet mechanism a frictional self-locking mechanism is employed.

The return motion of the control rocker member 12 may, as indicated in FIGS. 9 through 11, also be caused or aided by an additional return mechanism 88. In this case reversal of the current supply and/or bidirectional operation of the flexible element 37 is employed to cause a deflection movement of the flexible element 37 away from the control rocker member 12 so that the flexible element 37 acts on a movable unlocking member 89 which so deflects the pivot lever 86 for a short time that the second and third teeth 85 and 87 are disengaged.

There may also be a provision such that even in its electrically non-excited, home position the flexible element 37 so acts on the unlocking member 39 that it holds the said teeth out of engagement with each other.

For opening the valve in this case there is a change over between a low voltage and a higher voltage in order to prevent unlocking during the switching operation. On switching off the electrical supply or during a failure of the electrical power the flexible element 37 will automatically switch into the home position and will cause unlocking so that the controlled fluid duct opening will be closed. This means that a so-called fail-safe characteristic will be implemented.

The positioning means 83 generally provides for the possibility of causing a gradual opening in steps of the valve by single or multiple actuation of the flexible element 37.

The design may furthermore be such that the control rocker member 12 is turned by the flexible element 37 through one angular step in the one direction in order after a following second actuation to pivot back into the initial position. It is in this manner that a bistable valve function is implemented.

In connection with the positioning means 83 the value means 1 may be utilized as a fluid choke, with which different flow cross sections may be predetermined. In this case it is an advantage that the set valve will be maintained even without a supply of power.

Finally with the valve means in accordance with the invention there is also the possibility of using starting control electronic circuitry, which permit soft starting of the preferably piezoelectric flexible element 37 in order to gently move the control rocker member 12 softly onto the controlled fluid duct openings 25a and 25b and, respectively, the valve seats constituted by same. Accordingly wear of sealing material and of the valve seat is minimized. By suitably optimizing the closing and, respectively, opening operation, that is to say more particularly by braking the deflection movement of the flexible element 37 near a controlled fluid duct opening 25a and 25b and rapid movements in the phase between such proximity to the openings, it is possible to ensure rapid switching operations.

The valve means 1 is suited for the control of all fluids, it being more particularly suitable for use in the pneumatic sector with advantage. Owing to the possible structure which is advantageous as regards minimizing the effects of manufacturing inaccuracies, full use may be made of the stroke of the flexible element. The flexible element 37 is not mechanically loaded in the home or inactive position of the valve so that it will be free of mechanical relaxation.

All details of the valve means may be adopted as such alone or in any desired combination. Thus as regards the bearing means, production of the spring loading effect or bias or provision of a sealing material layer, it is possible for instance to adopt the design of the control rocker member in a valve means, in the case of which the actuating force $F_B$ is produced in some other way and for instance by means of a biased flexible element. The same will apply for the positioning means as well.

What is claimed is:

1. A valve means comprising a valve housing, which delimits a control chamber, into which a plurality of fluid ducts open and in which a control rocker member is arranged serving for the control of at least one of the fluid duct openings and adapted to be pivoted between at least two terminal positions, its pivotal position being able to be influenced by an electrically activated flexible element, which is adapted to act on an actuating portion of the control rocker member, wherein the control rocker member including its actuating portion is accommodated in the control chamber and is biased by spring means without involvement of the flexible element into a first one of the two terminal positions, the flexible element in a non-electrically excited condition within the control chamber being substantially free of mechanical stress and without spring bias, engaging the actuating portion of the control rocker member in the first terminal position of said member.

2. The valve means as set forth in claim 1, wherein the flexible element is a piezoelectric flexible element composed of piezoelectric material.

3. The valve means as set forth in claim 1, wherein in the first terminal position the control rocker member so closes a controlled fluid duct opening that the valve means possesses a normally closed characteristic.

4. The valve means as set forth in claim 1, wherein in the control chamber two fluid duct openings are provided controlled by the control rocker member and which in the two terminal positions of the control rocker member are alternately closed and opened, the closure of the respectively one fluid duct opening occurring with the clearing of the respectively other fluid duct opening.

5. The valve means as set forth in claim 4, wherein the two controlled fluid duct openings are under the control of different rocking arms of the control rocker member.

6. The valve means as set forth in claim 5, wherein the two controlled fluid duct openings are jointly placed on the same side of the control rocker member opposite to a rocking face, which extends over both rocking arms and at the same time is aligned athwart the pivot axis of the control rocker member.

7. The valve means as set forth in claim 4, wherein the valve housing is of multi-part construction, the two controlled fluid duct openings being provided on the same housing part and the control rocker member being pivoted exclusively on the housing part having the two controlled fluid duct openings.

8. The valve means as set forth in claim 1, wherein the control rocker member bears a layer of sealing material in the portion thereof cooperating with the respective fluid duct opening.

9. The valve means as set forth in claim 8, wherein the control rocker member has its side bearing the sealing material supported by a fulcrum ledge on the housing in a pivotal manner, it bearing at the site of such support a material layer which is suitable as regards the material and the thickness of the sealing material layer, such layer being integral with the sealing material layer on the control rocker member.

10. The valve means as set forth in claim 1, wherein the flexible element extends from an attachment point spaced from the control rocker member toward the control rocker member, it at least partially overlapping the control rocker member on the side opposite to the at least one fluid duct opening to be controlled.

11. The valve means as set forth in claim 10, wherein the actuating portion, cooperating with the flexible element, of the control rocker member, is arranged at a distance from the pivot axis on the side thereof opposite to the attachment point.

12. The valve means as set forth in claim 11, wherein the spring means engage the control rocker member on the side of the pivot axis opposite to the actuating portion and approximately diametrally opposite thereto.

13. The valve means as set forth in claim 10, wherein the attachment point is located in an attachment chamber adjacent to the attachment point, in which chamber the flexible element has its rear terminal section fixed and out of which chamber the front terminal section of the flexible element extends into the control chamber.

14. The valve means as set forth in claim 1, wherein the home position of the flexible element assumed in the non-electrically-excited state corresponds to that position, which is assumed by the flexible element on assembly of the valve means simply owing to its own weight after it has been placed on the actuating portion of the control rocker member and at least one along point on the housing.

15. The valve means as set forth in claim 1, wherein the control rocker member rests on a fulcrum ledge in a pivoting manner in relation to same in order to define the pivot axis, it engaging securing means on the housing to secure it in position and to ensure pivotal mobility.

16. The valve means as set forth in claim 1, wherein the spring means are bodily arranged in the control chamber.

17. The valve means as set forth in claim 1, wherein the control rocker member is held by the spring means on the valve housing.

18. The valve means as set forth in claim 1, wherein the spring means act on the control rocker member with a spring force directed in parallelism to the actuating force of the flexible element.

19. The valve means as set forth in claim 1, wherein the spring means include at least one spring lug which on the one hand is anchored to the housing and on the other hand engages the control rocker member.

20. The valve means as set forth in claim 19, wherein the spring lug and the control rocker member are arranged in a row alignment direction athwart the pivot axis of the control rocker member one after the other.

21. The valve means as set forth in claim 20, wherein the flexible element straddles the spring lug and the control rocker member with an alignment parallel to said row alignment direction.

22. The valve means as set forth in claim 19, wherein the spring lug is a component of a spring unit, which possesses an anchoring section bearing the spring lug, it being fixed in relation to the housing by such anchoring section.

23. The valve means as set forth in claim 22, wherein the anchoring section possesses a flat carrying portion with lateral resiliently elastic claws, it being fixed in position by means of the claws in the control space on the wall of the valve housing.

24. The valve means as set forth in claim 1, wherein the spring means comprise torsion rod elements aligned in the same direction as the pivot axis, such elements extending between the control rocker member and the valve housing and preferably simultaneously defining the pivot axis.

25. The valve means as set forth in claim 24, comprising attachment parts secured to the end opposite to the control rocker member, of the torsion rod elements, on the valve housing.

26. The valve means as set forth in claim 25, wherein the control rocker member is in the form of a component integral with the torsion rod elements and the attachment parts.

27. The valve means as set forth in claim 25, wherein the attachment parts are held between holding faces of two housing parts, acting on them during assembly of the valve housing, in such a position that the control rocker member is urged into the first terminal position and additionally the torsion rod elements are turned through a certain angle in relation to their unstressed inactive position to produce the desired bias.

28. The valve means as set forth in claim 27, wherein the holding faces extend at a slope in relation to the longitudinal axis of the valve housing.

29. The valve means as set forth in claim 1, wherein the valve housing comprises a bottom part having a floor and a surrounding side wall and furthermore a top part constituting a lid, between which parts the control space is delimited.

30. The valve means as set forth in claim 29, further including a plurality of attachment ports and a plurality of torsion rod elements, wherein the plurality of attachment parts are held between the holding faces of two housing parts, acting on them during assembly of the valve housing, in such a position that the control rocker member is urged into the first terminal position and additionally the plurality of torsion rod elements are turned through a certain angle in relation to their unstressed inactive position to produce the desired bias and wherein the holding faces cooperating with a respective attachment part, are on the one hand provided on the bottom part and on the other hand on the top part.

31. The valve means as set forth in claim 1, wherein the flexible element is a component of a drive means for the control rocker member, which additionally includes positioning means, which render possible a pivoting in steps of the control rocker member and define a ratchet mechanism or a self-locking mechanism.

32. The valve means as set forth in claim 1, comprising, in addition to the first control unit, the control rocker member and the spring means, a suitably designed second control unit adapted for controlling at least one further fluid duct opening, the control rocker members of both control units being able to be operated by the flexible element.

33. The valve means as set forth in claim 32, wherein in the two control units are arranged in a bilaterally symmetrical fashion as related to the plane of extent of the flexible element.

34. The valve means as set forth in claim 1, comprising adjustment means for adjustably predetermining the position of the pivot axis, assumed as related to the fluid duct openings to be controlled, of the control rocker member.

35. The valve means as set forth in claim 1, wherein the operating voltage of the flexible element is able to be applied steplessly for this purpose of obtaining a continuous control behavior of the control rocker member.

36. The valve means as set forth in claim 1, wherein in the first terminal position the control rocker member so clears a controlled fluid duct opening that the valve means possesses a normally open characteristic.

* * * * *